Figure 1:
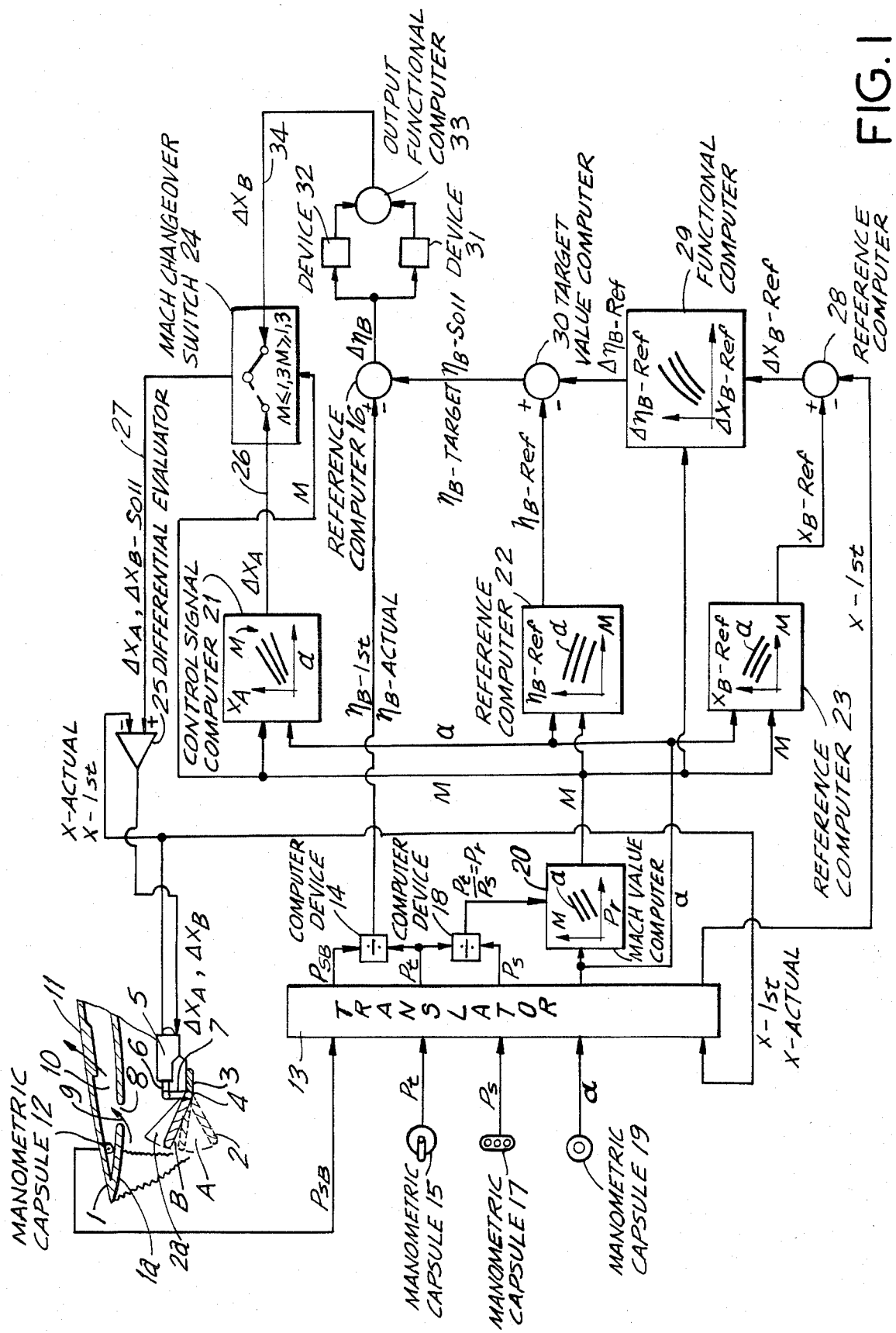

United States Patent [19]
Peikert

[11] Patent Number: 4,523,603
[45] Date of Patent: Jun. 18, 1985

[54] AIR INTAKE CONTROL FOR AN ADJUSTABLE AIR INLET, PARTICULARLY TWO-DIMENSIONAL OBLIQUE SHOCK DIFFUSER FOR GAS TURBINE JET ENGINES FOR THE PROPULSION OF HIGH PERFORMANCE AIRCRAFT

[76] Inventor: Jürgen Peikert, Johann Houis Str. 34, 8 München 70, Fed. Rep. of Germany

[21] Appl. No.: 222,267

[22] Filed: Dec. 10, 1980

[51] Int. Cl.³ .............................................. F41C 7/042
[52] U.S. Cl. .............................. 137/15.2; 364/431.02; 244/53 B
[58] Field of Search ............................ 137/15.1, 15.2; 244/53 B; 364/424, 431.02, 434, 435

[56] References Cited

U.S. PATENT DOCUMENTS

| | | | |
|---|---|---|---|
| 3,141,300 | 7/1964 | Turcat | 244/53 B |
| 3,186,661 | 6/1965 | Denning et al. | 244/53 B |
| 4,025,008 | 5/1977 | Peikert | 244/53 B |

FOREIGN PATENT DOCUMENTS

| | | |
|---|---|---|
| 1066428 | 9/1961 | Fed. Rep. of Germany . |
| 2358926 | 12/1978 | Fed. Rep. of Germany . |

OTHER PUBLICATIONS

R. A. Bishop, "Supersonic Propulsion", Oil Engine and Gas Turbine, Sep. 1964, pp. 36-39.

*Primary Examiner*—Stephen C. Bentley
*Attorney, Agent, or Firm*—Toren, McGeady, Stanger

[57] ABSTRACT

A variable air inlet includes an air intake duct with upper ramps, an air inlet bottom spaced below the ramp and a movable air scoop lip pivotally secured to the end of the air inlet bottom closer to the opening into the air intake duct. The air scoop lip is pivotally displaceable through two angular operating ranges, a wider one in the subsonic/transonic range and a narrower one in the upper supersonic range. Various control members including computers are used to control the position of the lower air scoop lip. The movement in the subsonic/transonic range is effected in response to the flight machnumber and the aircarft angle of attack based on a given control law. The control in the supersonic range is established in response to a variable demand pressure ratio between the static pressure above the upper ramps and the free stream total pressure, with the variable demand pressure ratio being a function of the actual air scoop lip position.

6 Claims, 4 Drawing Figures

AIR INTAKE CONTROL FOR AN ADJUSTABLE AIR INLET, PARTICULARLY TWO-DIMENSIONAL OBLIQUE SHOCK DIFFUSER FOR GAS TURBINE JET ENGINES FOR THE PROPULSION OF HIGH PERFORMANCE AIRCRAFT

The invention relates to a variable air inlet, specifically a two-dimensional oblique shock diffuser for gas turbine jet engines for the propulsion of high-performance aircraft, having upper ramps and a lower air scoop lip frontally linked to the air inlet bottom and swivelable via a lateral axis.

The job of an aircraft air inlet is to convert a maximal amount of the kinetic energy of approach flow air to compressed-air energy under reduction of its speed. Specifically with higher mach numbers this energy recovery can be of a considerable amount. To optimize the latter the scooped-up and compressed air must lose only little in the process and be fed in a homogeneous state and in a properly metered amount to the engine according to the latter's instantaneous output. Primarily produced flow losses include air friction, compression shocks, and overflow drags. In this case special attention must be paid also to external flow drags, which must be kept at a minimal level. Air inhomogeneous conditions result primarily from pressure inequalities within the flow itself. A successful avoidance to a maximal extent of above problems produces a propulsion system comprising an air inlet and gas turbine engine with a high-efficiency thrust over all of its output ranges. This then guarantees to a great extent an aerodynamically stable cooperation between air inlet and engine.

On starting and at very low flight speeds the air—because of the low pressure prevailing at the inlet end—is fed to the engine at a high volume, which means that the air inlet's mechanically narrowest flow cross-section must be maximally large-dimensioned. On the other hand, in high supersonic flight the air volume at the inlet end—because of the prevailing high pressure—is extremely low, which means that the mechanically narrowest flow cross-section must be minimally (small) dimensioned, so that in the air inlet entrance area the required level of shock waves can be maintained. Furthermore, today's high-performance fighter aircraft with supersonic capability must meet aerial combat standards particularly in the subsonic range. This type of operation calls for high aircraft angles of attack. On start and in subsonic flight with high angles of attack and maximal engine air thruput, therefore, the air scoop area must be maximally large-dimensioned; by contrast, the latter—for minimal air thruput in the supersonic range, e.g., under relatively high air temperature, partial-load operational and high mach-numerical conditions—must be small-dimensioned. These divergent requirements cannot be met by an air inlet equipped with a rigid scoop area, because the latter type with subsonic flight produced extreme angles of attack starts a surging effect because of the breakdown in inlet flow effective on a rigid inlet lip, and with low engine air requirements in supersonic flight is the cause for shock-wave oscillation produced inlet buzz, which lead to propulsion system instabilities. Thus, because a rigid air inlet has only a narrowly limited stable operating range, for high-performance engines a variable air inlet is provided, which is controlled or varied as a function of various flight parameters.

In the trade paper "Oil Engine and Gas Turbine," vol. 32, September 1964, pp 36 thru 39, a supersonic air inlet, operating as a two-dimensional variable oblique shock diffuser with upper center movable ramps and a blow-off device at the inlet end ahead of a gas turbine engine, is described. Thereby, the upper movable ramps are controlled as a function of the respective flight mach number, while the air blow-off flaps are opened in case the air inlet unexpectedly enters a subcritical operating state, i.e., if the air inlet supplies an air volume higher than instantaneously required by the engine.

According to German patent disclosure No. 23 58 926 equally a controlled supersonic air inlet with upper movable, central ramps is known, the respective position of which is regulated as a function of a measurable variable, which forms the ratio between respective static pressure put on the movable ramps and the respective total pressure of the external flow. This type of regulation effects that the air inlet supplies engine air thruput volumes for obtaining respectively optimal thrust over the entire supersonic flight operational range.

Both aforementioned air inlet concepts—with respect to their inlet geometrical control—are laid out specifically for supersonic operation, and are not specialized for extreme flight conditions in the subsonic range.

German patent appl. No. 1 066 429 discloses a 2-dimensional supersonic air inlet shaped as a bilateral oblique shock diffuser, the leading edges of which are developed as swivelable air scoop lips over and under central shock taper. A system and device for controlling or regulating the shown lower and upper air scoop lips according to any given parameters has not been disclosed there.

At this point the object of the invention is to suggest for the initially described type of air inlet a control program and system for implementing same, so that over the entire subsonic-and-supersonic flight range even under extreme flight conditions including the start optimal air inlet operating conditions are guaranteed by creating a wide-operational area effective between existing aerodynamical stability limits, air inlet buzz on the one hand and engine surge on the other hand.

This problem according to the invention is solved in such a way that the entire swiveling area of the air scoop lip in a functionally engineered way is divided into a lower subsonic/transonic, angular-wider operating range between a lower set point and a mean set point, and into an upper supersonic, angular-narrower operating range between the mean set point and upper set point, and that the set angle $\delta_A$-variables of the air scoop lip in the lower operating range are controlled as a function of flight mach numbers ranging between 0 and about mach 1.3 and of respective aircraft angles of attack $\alpha$ according to functional equation $\delta_A = f((1/M), \alpha)$, and that the set angle $\delta_B$-variables of the air scoop lip in the upper operating range are so regulated according to a variable target value as ratio between the static pressure prevailing on the upper ramp and the total pressure of the external flow that a supply of engine air thruput volumes required for the respective optimal thrust in supersonic flight is guaranteed. Thereby the mean set point (b) matches or approximates the position of a rigidly developed air scoop lip, i.e., it forms here the "normal" continuance of the air inlet bottom.

The result produced by the invention is that in the subsonic/transonic flight range the approach flow air is provided with a variable, always adaptable scoop area having a optimal configuration as a function of flown mach numbers and aircraft angles of attack, so that flow breakdowns and resultant surgings are avoided even under extreme angles of attack. Furthermore, in the supersonic range the air inlet according to the invention, operates by adapting its air-inlet cross-section respectively by controlled its inlet geometry for engine required air thruputs, namely, always at a point somewhat exceeding the critical operating point, that is slightly subcritical, i.e., at a point of minimal drag, so that the actual result is a constant maximal pressure recovery or air thruput.

To implement the invention for airscoop lip control in the lower operating range, a control signal computer is provided, in which the respective flight mach numbers and aircraft angles of attack are input in flight. The control signal computer has a control characteristic field, in which are stored target control curves derived from computer and/or wind tunnel-and/or flight test for optimal engine air thruput values.

Further inventive features for regulating the controlled angle of the airscoop lip in the upper operating range include a control characteristic field, one axis of which (ordinate) is determined by the pressure ratio ($\eta_B$) and the other axis of which (abscissa) by the actually controlled air scoop lip position or a value proportional to it, where target control curves are stored, the values of which were preset by computer and/or wind tunnel-and/or flight test means. In case of a deviation from the norm, the latter (deviation) is determined by comparing the respective target value ($\eta_B$-target) with the instantaneous actual value ($\eta_B$-act.), and is reduced to zero by controlling the actual air scoop lip angle ($\delta_B$) accordingly.

According to the invention, the control characteristic field sequenced target control curves show defined end coordinates, socalled reference points, which match specific selected flight mach numbers and angles of attack. In case of an operational status change or occurring deviation from the norm, the matching or closest reference point of a target control curve is triggered.

In developing the invention the control system for controlling the airscoop lip in the upper operating range is designed and operates as follows:

If a deviation from the norm occurs, one of the reference values of the reference point, namely that of the controlling angle variable of the selected target control curve is determined by a reference computer as a function of respective flight mach number and the angle of attack, and is fed to a first differential computer, simultaneously input in which is the actual value of the airscoop lip's control angle, from which the differential value is computed, which is fed to a functional computer for determining the associated incremental functional value of a controlled variable, for passing the latter on to a second differential computer. By way of a further reference computer (also as a function of mach number and angle of attack) the other reference value of the reference point, namely that of the measured-and controlled variable of the selected target control curve is determined, which value then is equally fed to the second differential computer. The latter subtracts aforementioned functional value of the measured or controlled variable from aforementioned reference value, so that a new target value of the controlled variable is formed, which is fed to a reference computer.

The latter—by means of the measured actual value of the controlled variable—determines the deviation from the norm or the control signal, which is passed on to an output functional computer, where the equivalent set-angle value is computed as control signal, which—together with the actual value of the air scoop lip's control angle—is fed to a different evaluator, whereupon the determined angular deviation is reduced to zero.

In a further development of the invention the control device, the control signal computer, and the regulator device, i.e., the output functional computer are post-staged by a mach changeover switch, which in the lower operating range connects the control signal computer, and in the upper operating range the output functional computer to a controller/regulator signal line.

With a variable geometry type of supersonic air inlet the positions of movable control components determine the respective air thruput volumes in kg. per second, which respectively represent the product from air inlet produced pressure recovery and instantaneous inlet cross-section. This product reaches its maximum, as previously explained, if the air inlet operates in a slightly subcritical state against minimal drag.

Even today (considering the required, extremely varying operational air thruput volumes) it is extremely difficult to set the control components always so that the air inlet, too, operates optimally. The reason for this is that the final control variable in flight practically cannot be measured and, therefore, must be eliminated as direct control variable.

From a practical point of view, therefore, the distinct advantage of the invention is that any potential optimal target values are preset to an approximately exact degree if with a higher measuring technological input, and that based on these values the regulated or controlled variable according to the invention during flight operations is used as target value in lieu of the practically produced optimal air thruput, i.e., as a function of matching the angular settings of the air scoop lip, and that the latter is set according to the proposed control rule. The special advantage to be considered is that the actual values of the used control variable can be tested in a simple way under practical flight-operational conditions. This equally applies to determining the end coordinates for the respective control target curve by the potential given through precisely measuring flight mach numbers and angles of attack, plus the potential of exactly establishing the air scoop lip-actual angle, from which the control variable-target values can be determined.

Figure 1A:
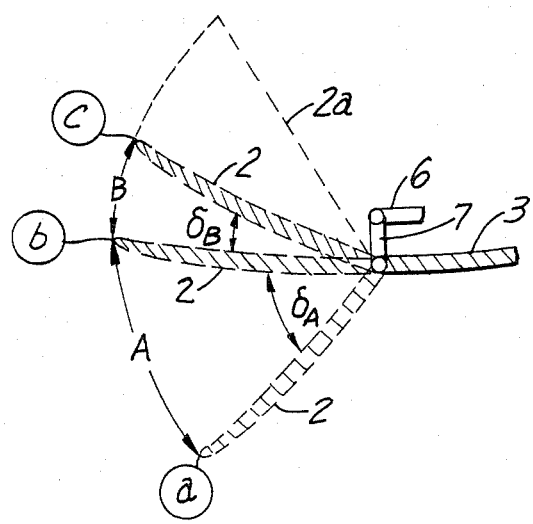
Figure 2:
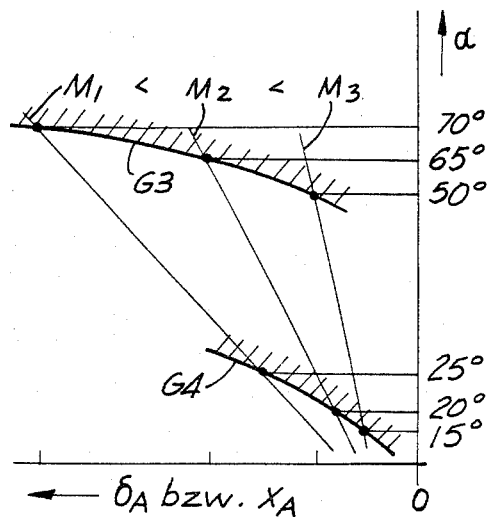
Figure 3:
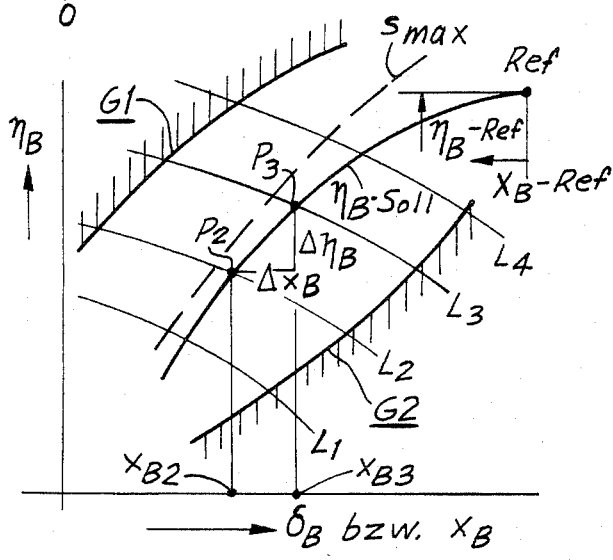

In the accompanying drawing an exemplified embodiment according to the invention is shown, wherein:

FIG. 1 schematizes a control-and regulator system for the adjustable air scoop lip of an air inlet;

FIG. 1a the air scoop lip and its entire operating range according to FIG. 1 on an enlarged scale;

FIG. 2 a characteristic field for controlling the air scoop lip in the subsonic and transonic speed range A, and FIG. 3 a characteristic field for controlling the air scoop lip in the supersonic speed range B.

As shown in FIG. 1, the air inlet is developed as one-sided, oblique shock diffuser with an advanced upper rigid shock taper 1, an upper ramp 1a, and a lower movable airscoop lip 2. The latter is frontally linked to inlet bottom 3 via a lateral axis 4, and shows pulled-up lateral parts 2a. This way the airscoop lip 2 is paddle-like developed. In the subsonic/transonic speed range (0 thru approx. mach 1.3) the airscoop lip 2 is controlled in operating range A between a lower set point a and a mean set point b, which is equivalent to a control angle of 0°. Here the controllable airscoop lip 2 assumes a "normal position", i.e., the position of a rigid airscoop lip. Control angle $\delta_A$ reaches its maximum at set point a. In the supersonic speed range (from about 1.3 mach on) the airscoop lip 2 is controlled in operating range B between mean set point b and an upper set point c. Control angle $\delta_B$ reaches its maximum at set point c.

Air scoop lip 2 is actuated by means of a hydraulic operating cylinder 5, the piston rod 6 of which is linked to an angle lever 7, the lever being rigidly connected to airscoop lip 2. Shock taper 1 has a slot 8 for socalled bleed flow 9, which enters space 10 above shock taper 1 and reenters the outside through grid 11. The bleed flow 9-static pressure $p_{SB}$, which varies over the entire air inlet operating range, is measured by means of a manometric capsule 12 and is input into translator 13, which converts the measured pneumatic values to electrical values, and feeds them to a computer device 14. The respective total pressure $p_t$ of the external flow is measured by means of a further manometric capsule 15 and is also fed to translator 13, which passes it on to the computer device 14. The latter from both values $p_{SB}$ and $p_t$ determines the dimensionless $\eta_B$-actual ratio, which is fed to a reference computer 16, which will be discussed in more detail later on.

Using a second manometric capsule 17 the static pressure $p_s$ of the external flow is measured and input—simultaneously with total pressure $p_t$—in a computer device 18 via translator 13, for the device to determine value $p_R = p_t/p_s$ in lieu of the flight mach number. A further capsule 19 establishes the flight angle of attack $\alpha$.

As shown further in FIG. 1 the controller-and regulator device on its input side has a mach value computer 20, which determines the actual flight mach number M as a function of the measured value $p_R$ and the respective angle of attack $\alpha$, for M to be passed on to a control signal computer 21, a$\eta_B$-reference computer 22, a$\chi_B$-reference computer 23, and a mach changeover switch 24. Simultaneously the measured flight angles of attack $\alpha$ are fed to control signal computer 21, and computers 22 and 23.

As shown in the diagram according to FIG. 2, the control characteristic field shown there for the lower operating range A of airscoop lip 2 is characterized in that on the ordinate the flight angles of attack $\alpha$, and on the abscissa the set angles $\delta_A$ for airscoop lip 2 or the matching control signal values $\chi_A$ are plotted, while in the control characteristic field itself a number of curves $M_1$, $M_2$, $M_3$ are sequenced. Thus, the control signal computer 21 determines—because of $M_1 < M_2 < M_3$—according to function $\chi_A = f(\alpha,(1/M))$ the respective $\chi_A$-target control signal (matching the $\delta_A$-target), and passes it on to differential evaluator 25 via control signal line 26, mach changeover switch 24, and a common controller-regulator signal line 27, while simultaneously the airscoop lip 2—instantaneous set angle $\delta_A$-actual function $\chi_A$-actual value is fed to 25. From both of these values $\Delta\chi_A$ is computed, i.e., finally the physical measure in mm for the travel of piston rod 6 or that for operating cylinder 5 in volumic units of hydraulic fluid is established. Operating cylinder 5 then is supplied with the proper amount of hydraulic fluid so that deviation from the norm $\Delta\chi_A$ can be reduced to zero. On controlling airscoop lip 2 in operating area A the mach changeover switch 24 is set so that control signal line 26 is electrically connected to controller-regulator signal line 27.

According to the diagram of FIG. 2 into the control characteristic field an upper aerodynamic limit G3 is plotted, which (upward) must not be exceeded to avoid engine surgings through flow breakdowns in the air inlet. This shows that despite extremely high angles of attack $\alpha$ still useable air inlet conditions for the engine can be obtained by a maximal pull-down of airscoop lip 2. This applies also to relatively high mach numbers ($M_3$) in the subsonic range, where operations with relatively high angles of attack $\alpha$ can still be effective.

In contradistinction to above, phantom characteristic G4 shows that with given speeds $M_1$, $M_2$, $M_3$ . . . without any adjustment of the airscoop lip, meaning with rigid lower airscoop lip, only relatively small angles of attack $\alpha$ can be tolerated or risk engine surging.

Curves $M_1$, $M_2$, $M_3$, . . . therefore, represent target-control characteristics, which mark control system triggered control angles $\delta A$ for relatively high, specifically maximal engine air thruputs as a function of respective flight angle of attack $\alpha$. The control rule $\delta_A = f((1/M),\alpha)$ means that with rising angle of attack $\alpha$ the control variable $\chi_A$ and that way also set angle $\delta_A$ increases, i.e., the airscoop lip 2 is further pulled down, while with rising mach number M the control variable $\chi_A$ and that way also set angle $\delta_A$ decreases and vice versa.

Care must be taken that with a respectively flown mach number the respective maximal angle of attack $\alpha$ not be exceeded or that this at least be warning-signaled on exceeding maximum.

As shown in FIG. 3, the control characteristic field for upper operating area B of airscoop lip 2 is characterized by variable ratio $\eta_B$, the values of which are plotted on the ordinate, and by variable $\chi_B$, which, being proportional to respective set angle $\delta_B$ of airscoop lip 2, is plotted on the abscissa. For simplified overview of the infinite plurality of air thruput values only four air thruput characteristics $L_1$ thru $L_4$ are plotted, whereby $L_1 > L_2 > L_3 > L_4$. The control characteristic field within the operating range of the propulsion system comprising the engine and air inlet is limited by both aerodynamic boundaries G1 for the "inlet buzz" and G2 for "engine surging". $S_{max}$ designates the curve of engine maximal thrust. $\eta_B$-target in each case means a curve for the measured or controlled variable, according to which the airscoop lip angles $\delta_B$ in operating area B are set, i.e., $\eta_B$-target is the command variable, which, in each case, dictates an air-scoop lip-angle $\delta_B$, for the latter to guarantee an optimally operating air inlet; this applies to the entire operating range. In other words, $\eta_B$-target and target air-scoop lip angle ($\delta_B$-target) are functionally interrelated and in each case form a regulator command-target curve in the control characteristic field. As previously mentioned, the respectively optimal set angle for airscoop lip 2 is preset by computer and test-stand-and flight tests, and for this purpose the operational $\eta_B$-target is registered in the regulator-tested code. The $\eta_B$-target value, therefore, forms a measured or controlled variable being proportional to air-scoop lip 2-set angle $\delta_B$ by substituting for same.

As previously noted, the regulator shows a number of $\eta_B$-target control curves. For easier overview in FIG. 3 only one of these $\eta_B$-target curves is plotted.

$\eta_B$-target control curves show end points, socalled reference points, which mark the end coordinates for $\eta_B$-ref and $\chi_B$ ref values. These reference points and, therefore, also the characteristic of the respective $\eta_B$-target curve are determined by the respective flight mach number M or the computed value $p_R = p_t/p_s$, and the respective aircraft angle of attack $\alpha$. The diagram shown in FIG. 3 is based, e.g., on mach number M = 1.9 and angle of attack = 3.5°. For any other flight mach numbers and any other aircraft angles of attack other $\eta_B$-target curves apply.

In a preferred embodiment of the regulating concept according to the invention both $S_{max}$ and $\eta_B$-target curves run in close proximity to each other.

As further shown in FIG. 1, the respective end coordinate-value $\chi_B$-ref is computed in $\chi_B$-reference computer 23 as a function of mach number M and angle of attack $\alpha$; the same operation is executed in $\eta_B$-reference computer 22 for end coordinate value $\eta_B$-ref. The practical result is that both computers 22 and 23—based on measured mach number -M and angle of attack $\alpha$-values—trigger those $\eta_B$ ref and $\chi$-ref end coordinates, which come closest to the measured values thereof. The determined $\chi_B$-ref value—together with the $\chi_B$-actual value (instantaneous actual value of airscoop lip 2-control angle $\delta_B$ in upper operating area B)—is input in a reference computer 28; from both of these values the $\Delta\chi_B$-ref. differential value is computed. The value is fed to a functional computer 29, in which the $\eta_B$-target control curves are stored. The functional computer 29—because $\eta_B$ is a function of $\chi_B$—computes the functionally associated value $\Delta\eta_B$-ref. This differential value—together with the $\eta_B$-ref value—is fed to a target value computer 30, where, by subtraction, the respective regulated target point $\eta_B$ is determined. The value is passed on to reference computer 16, and compared there with the $\eta_B$-actual value, from which the $\Delta\eta_B$-deviation from the norm is established. Devices 31 and 32 form the dynamic component of the regulator, and in a post-staged output functional computer 33 the $\chi_B$-target value—based on the functional interrelationship between $\eta_B$ and $\chi_B$ ($\delta_B$)—is determined from the $\eta_B$-target value. $\chi_B$-target—simultaneously with instantaneous set angle $\delta_B$ corresponding to $\chi_B$-actual value—is fed to differential evaluator 25 via compensating/regulating/signal line 34 and mach changeover switch 24 as well as via controller-compensator signal line 27. From both of these values $\Delta\chi_B$ is computed, i.e., as with the control procedures in operating area A, the physical measure in mm. for the travel of piston rod 6 or that for operating cylinder 5 in hydraulic fluid-volumic units is established. 5 then is supplied with the required amount of hydraulic fluid, so that the deviation from the norm $\Delta\chi_B$ can be reduced to zero.

In the diagram according to FIG. 3, a performance change from operating point $P_2$ to operating point $P_3$ with a lower output corresponding to lower air thruput is illustrated. In this case during the control process the preceding control angle value $\chi_{B2}$ is increased by the differential value $\Delta\chi_B$ (increase) to value $\chi_{B3}$, i.e., the "air scoop lip" angle $\delta_B$ is increased, by swiveling the airscoop lip 2 further upward, so that the air inlet scoop area is decreased.

I claim:

1. An air intake control for a variable air inlet, such as for a two-dimensional oblique shock diffuser for gas turbine engines for the propulsion of high performance aircraft, comprising an axially extending air intake duct having an inlet end and comprising upper ramps located at the inlet end, an air inlet bottom spaced below said upper ramps and spaced in the axial direction of said air intake duct from the inlet end, a movable air scoop lip pivotally connected to said air inlet bottom about an axis extending transversely of the axial direction of said air intake duct and extending from said axis located at the end of said air inlet bottom closer to the inlet end toward said inlet end, drive means for moving said air scoop lip in a lower subsonic/transconic, wider-angular operating range (A) between a lower set point (a) with a maximum set angle of $\delta_A$-max more remote from said upper ramps and a mean set point (b) closer to said upper ramps, and a smaller angular range (B) between said mean set point (b) and an upper mean set point (c) closer to said upper ramps than said mean set point (b) and said smaller angular range (B) having a maximum set angle of $\delta_B$-max, first control means for producing a first electrical control demand signal for driving said drive means and moving said air scoop lip in the wider-angular operating range (A) in response to flight mach-number (M) and the the aircraft angle of attack ($\alpha$) according to the functional control law $\delta_A = f(1/M)$, $\alpha$, and second control means for producing a second electrical control demand signal for driving said drive means and moving said air scoop lip in the upper smaller angular range (B) in response to a variable demand pressure ratio between the static pressure above said upper ramps and the free stream total pressure said variable demand pressure ratio being a function of the actual air scoop lip position.

2. An air intake control, as set forth in claim 1, wherein said first electrical control demand signal for the required air scoop lip position in the wider angle operating range (A) is derived by a functional computer containing stored maps in which the required demand values of the air scoop lip position are a function of the angle of attack ($\alpha$) and machnumber (M) and means for supplying the required demand values whereby in case of any error signal between the demand and actual air scoop lip position, the lip position is varied until the error is at zero to guarantee optimum intake operation conditions such as for maximum engine air flow.

3. An air intake control, as set forth in claim 1, wherein the second electrical control demand signal for the required scoop lip position in the smaller angular operating range (B) is derived for each machnumber (M) and angle of attack ($\alpha$) condition by a functional computer containing maps for the desired position and said functional computer maps have as one axis (ordinate) determined by the pressure ratio between the pressure above said upper ramps and the free stream total pressure, and the other axis (abscissa) determined by the actual air scoop lip position and said functional computer storing target control lines ($\delta_B$-target), the desired values are derived at least by said computer and in the case of an error signal between the demanded and actual value of the control pressure ratio ($\delta$) this error signal is controlled to zero by changing the actual air scoop lip position accordingly.

4. An air intake control, as set forth in claim 3, wherein the target control lines have defined end coordinates, and a selection computer for selecting so-called reference points ($\eta_B$-ref. and $\chi_B$-ref.) corresponding to specific selected flight machnumbers (M) and aircraft angles of attack $\alpha$ and in the case of an operational status change with respect to at least one of the flight machnumber (M) and the aircraft angle of attack (α) and the closest reference point ($\eta_P$-ref, $X_B$-ref.).

5. An air intake control, as set forth in claim 1, 3 or 4, including a reference computer (23) for determining the deviation from the reference point $X_B$-ref. of the selected target-control curve ($\eta_B$-target) based as a function of the flight machnumber (M) and the aircraft angle of attack (α), a first differential computer (28) arranged to receive the reference point and to receive at the same time the actual value ($X_B$-act.) and ($\delta_B$-act.) of said air scoop lip (2) timing angle ($\delta_B$), a functional computer (29) for receiving the differential value ($\Delta\chi_B$-ref.) from said first differential computer, a second differential computer (30) arrange to receive the signal from said functional computer (29), a further reference computer (22) for determining the reference point ($\eta_B$-ref.) of selected control curve ($\eta_B$-target) based as a function of the flight machnumber (M) and angle of attack (α) and said second differential computer (30) arranged to receive the data from said further reference computer (22), said second differential computer (30) subtracts value ($\Delta\eta_B$-ref.) from value ($\eta_B$-ref.) for producing a measured control variable ($\eta_B$), a reference computer (16) arranged to receive the controlled variable ($\eta_B$) for determining the deviation from the norm ($\Delta\eta_B$), an output functional computer 33 for receiving the measured variable and feeds of the deviation from the norm for controlling the determining control signal ($\Delta\chi_B$), a differential evaluator (25) arranged to receive the control signal for computing a mechanical adjustment.

6. An air intake control, as set forth in claim 1, 2, 3 or 4, including a control signal computer (21) and a switching device output functional computer (33) arranged to supply signals to a mach changeover switch (24), so that in the wider operating range (A) said changeover switch (24) interconnects said control signal computer (21) to a control switched signal line (27) and in the smaller operating range (B) said changeover switch interconnects said output functional computer (33) and said control switched signal line (27).

* * * * *